United States Patent Office 3,445,681
Patented May 20, 1969

3,445,681
COMPOSITE NON-LINEAR NETWORKS
Kenneth William Cattermole, Donald Robert Barber, and Edward Harry Lambourn, London, England, assignors to International Standard Electric Corporation, New York, N.Y., a corporation of Delaware
Filed July 1, 1965, Ser. No. 468,787
Claims priority, application Great Britain, July 17, 1964, 29,335/64
Int. Cl. G06g 7/22
U.S. Cl. 307—229                    12 Claims

ABSTRACT OF THE DISCLOSURE

A compandor network comprising a plurality of non-linear circuit units, each unit including at least two non-linear devices. Each of the units includes either a pair of transistors coupled in a voltage driven current switching arrangement, or a pair of diodes coupled in a current driven voltage switching arrangement. The various embodiments include series, parallel, and series-parallel combinations of such units, so as to yield an overall voltage-current characteristic consisting of a plurality of straight line characteristics, closely approximating a desired curve.

---

This invention relates to composite non-linear networks, and finds application particularly in amplitude compressors and expanders used in communication equipment.

According to the invention a non-linear network comprises a plurality of non-linear circuit units, each unit having different voltage/current characteristics and connected with their outputs in parallel, at least one of the said units being a pair of transistors coupled together in a current switching arrangement.

The term "non-linear circuit unit" as used in this specification and in the appended claims denotes an electrical circuit including two devices, each of which has a non-linear voltage/current characteristic, connected together in a voltage driven current switching arrangement or a current driven voltage switching arrangement. In the embodiments to be described in this specification the devices having the non-linear characteristics are semiconductor diodes and transistors.

An object of this invention is to provide composite non-linear networks utilizing basic non-linear current switching and non-linear voltage switching circuit units.

A further object of this invention is to provide amplitude compression networks for use in communication equipment.

A still further object of this invention is to provide amplitude expansion networks for use in communication equipment.

In a preferred embodiment of the invention the non-linear network includes two or more non-linear circuit units, each unit having different voltage/current characteristics and connected with their outputs in parallel, at least one of the units including a pair of transistors coupled together in a voltage driven current switching arrangement and at least one of the units including a pair of diodes coupled together in a current driven voltage switching arrangement.

The above-mentioned and other objects of this invention will become more apparent by reference to the following description taken in conjunction with the accompanying drawings, in which.

Figure 1A:
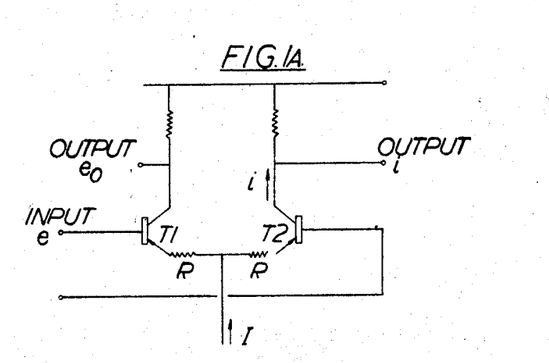
FIG. 1A is a schematic diagram of a current switching transistor circuit unit.

The basic non-linear circuit unit utilized in building up a non-linear network is the current switching transistor pair illustrated in FIG. 1A.

Figure 1B:
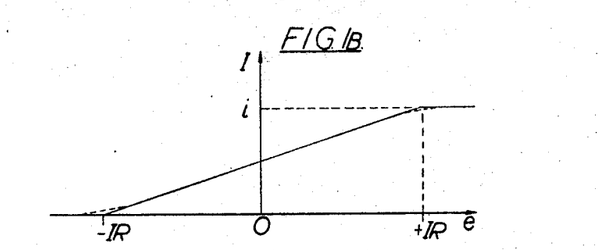
FIG. 1B is a curve illustrating the voltage/current characteristic of the circuit unit of FIG. 1A.

Transistors T1 and T2 are emitter coupled to a common current source I, which has a defined maximum value, determined by the value of the resistors R. The current I is divided between the transistors T1 and T2 according to the relative potentials at their bases. If therefore a potential $e$ is applied to the base of transistor T1 the current $i$ flowing in the collector circuit of transistor T2 depends on the value of $e$ relative to the potential at the base of transistor T2. FIG. 1B illustrates the relation between input voltage $e$ and output current $i$. It will be seen that although the circuit is referred to as non-linear the characteristic is in fact composed of three linear segments, two of which have zero slope.

As in other composite networks it is convenient to approximate the non-linearity by considering the linear segments thus:

$i = 0$ when $e \leq -IR$ (i.e. when $e$ is negative and exceeds IR)

$i = ge = \frac{1}{2}I$ when $-IR \leq e + \leq IR$, where $g = 1/2R$ $i = I$ when $+IR \leq e$ If IR is much greater than the normal forward voltage drop of the transistor emitter, this approximation is valid, and the behavior of the circuit is determined mainly by the resistors rather than the transistors. In practice the asymptotes of the approximation are correct, but the vertices will be rounded off in a manner dependent on the transistors. Thus in FIG. 1B the departure in practice from the ideal is illustrated by the dotted rounding off of the vertices. The approximation has an inherent skew-symmetry, which is beneficial if, as in the case of telephony, a symmetrical companding law is required.

Since both I and R are open to choice within a wide range a variety of scales may be allotted to the basic characteristic. The range may be extended by attenuating or amplifying the input, output or both.

Figure 2:
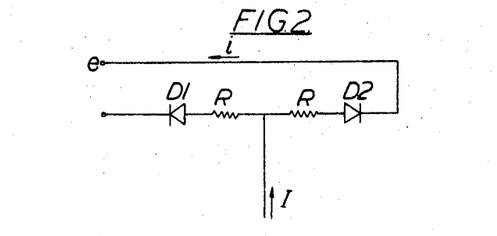
FIG. 2 is a schematic diagram of a current switching diode circuit unit.

An alternative non-linear circuit unit utilizing diodes is illustrated in FIG. 2. In this case the current I is divided between the diodes D1 and D2 according to the value of $e$. The characteristic is similar to that of the transistor circuit of FIG. 1.

Figure 3A:
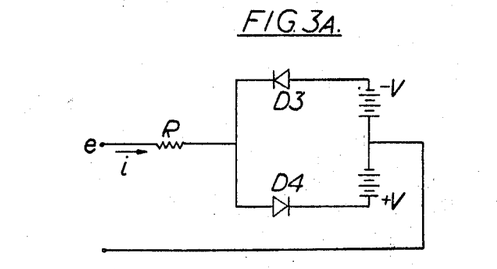
FIG. 3A is a schematic diagram of a voltage switching diode circuit unit.

Both FIGS. 1 and 2 illustrate voltage driven current switching circuits. FIG. 3A illustrates a current driven voltage switching arrangement incorporating two diodes D3 and D4.

Although the circuit in FIG. 3A is referred to as a current driven voltage switching circuit, it is expedient to treat the characteristic as through the circuit were a current switching arrangement. The reason for this is that when combinations of the various types of nonlinear circuit units are considered it is easier to deal with a plurality of characteristics having common co-ordinates. Hence the characteristic as shown in FIG. 3B is plotted against the same arrangement of coordinates as the characteristic shown in FIG. 1B.

Figure 3B:
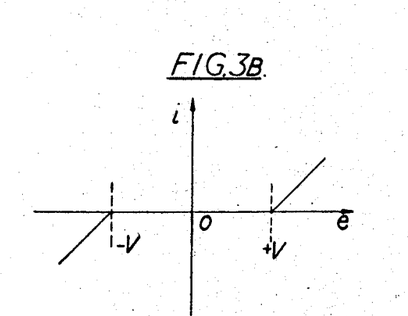
FIG. 3B is a curve illustrating the voltage/current characteristic of the circuit unit of FIG. 3A.

The approximation of the non-linear characteristic of FIG. 3 by a number of linear segments is thus:

$i = \frac{e+V}{R}$ when $e \leq -V$ $i = 0$ when $-V \leq e \leq +V$ $i = \frac{e-V}{R}$ when $+V \leq e$ As in the case of the current switching networks a variety of scales may be obtained by the choice of suitable circuit parameters.

Having described the various individual non-linear circuit units the combination of these units into non-linear networks is now considered.

Figure 4A:
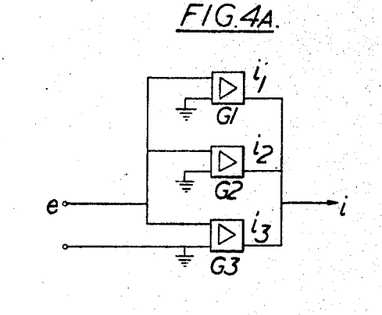
FIG. 4A is a block diagram of a parallel combination of non-linear circuit units embodying the present invention.

In FIG. 4A there is shown an arrangement of three current switching units G1, G2 and G3 having their inputs and outputs connected in parallel. For the purposes of comparison with the next two combinations to be described it is convenient to regard all three combinations as being made up of current switching transistor pairs as shown in FIG. 1.

It will be seen that in the arrangement of FIG. 4A all three units have the same input $e$, and the final output $i$ is the sum of the individual unit outputs $i_1$, $i_2$ and $i_3$. Each of the units G1, G2 and G3 has a different value of IR from the other units.

Figure 4B:
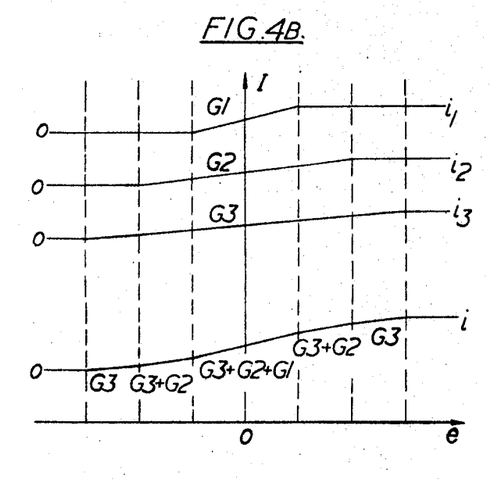
FIG. 4B is the series of curves illustrating the voltage/current characteristics of the block diagram of FIG. 4A.

FIG. 4B shows the three individual output characteristics $i_1$, $i_2$ and $i_3$ of the units G1, G2 and G3, and the final output characteristic $i$ when the units are combined in parallel.

The contribution from any one of the units, denoted by the suffix $r$, is $i_r = 0$ when $e_0 \leq -I_r R_r$ $i_r = g_r e_0 + \frac{1}{2} I_r$ when $-I_r R_r \leq e_0 \leq +I_r R_r$, $g_r = 1/2R_r$ $i_r = I_r$ when $+I_r R_r \leq e_0$ and the total output current is $$i = \sum_{r=1}^{n} i_r$$

It will be seen from FIG. 4 that combining a number of different non-linear circuit units, each of which has a characteristic composed of three linear segments, produces a final characteristic which, while composed of several short linear segments, nevertheless approximates to a continuously non-linear curve.

Figure 5A:
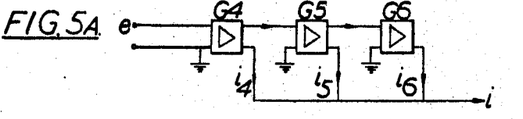
FIG. 5A is a block diagram of a tandem combination of non-linear circuit unit embodying the present invention.

A second arrangement of non-linear circuit units is illustrated in FIG. 5A. In this case the units G4, G5 and G6 are combined in what may be termed a "tandem" combination. As in the case of the parallel combination of FIG. 4A the individual outputs of the units G4, G5 and G6 are connected in parallel. The input $e$ is to the first stage G4 only. It will be remembered that each stage is equivalent to the transistor pair shown in FIG. 1A and that the output of each stage is taken from the collector of transistor T2 when the input is to the base of transistor T1. In the arrangement shown in FIG. 5A the input to the base of transistor T1 in unit G5 is provided by a connection from the collector circuit of transistor T1 of unit G4.

Reverting to FIG. 1 and the operation of the circuit as shown in FIG. 1A, as $e$ increases, not only will $i$ increase (over the central segment of the characteristic) but the potential $e_0$ at the collector of transisor T1 will also increase.

Therefore two gain parameters are now required to describe the behavior of each stage within its linear region. As before, the contribution to the output current is $i_r = 0$ when $e_{r-1} \leq -I_r R_r$ $i_r = g_r e_{r-1} \frac{1}{2} + I_r$ when $-I_r R_r \leq e_{r-1} \leq +I_r R_r$ $i_r = I_r$ when $+I_r R_r \leq e_{r-1}$ The transfer to the following stage is $e_r = -k_r I_r R_t$ when $e_{r-1} \leq -I_r R_r$ $e_r = k_r e_{r-1}$ when $-I_r R_r \leq e_{r-1} \leq +I_r R_r$ $e_r = +k_r I_r R_r$ when $+I_r R_r \leq e_{r-1}$ The contribution of each stage to the total output current is $i_r = 0$ when $e_0 \leq -I_r R_r / k_1 k_2 \ldots k_{r-1}$ $i_r = k_1 k_2 \ldots k_{r-1} g_r e_0 + \frac{1}{2} I_r$ when $$\frac{-I_r R_r}{k_1 k_2 \ldots k_{r-1}} \leq e_0 \leq + \frac{I_r R_r}{k_1 k_2 \ldots k_{r-1}} \leq e_0 \leq +I_r R_r / k_1 k_2$$

$i_r = I_r$ when $+I_r R_r / k_1 k_2 \ldots k_{r-1} \leq e_0$

It will be seen that, even with stages having the same value of IR, successively greater slopes are obtained by using the gain of successive stages in the inputs of succeeding stages. The range of slopes available is therefore much greater than with the previous parallel combination.

Figure 5B:
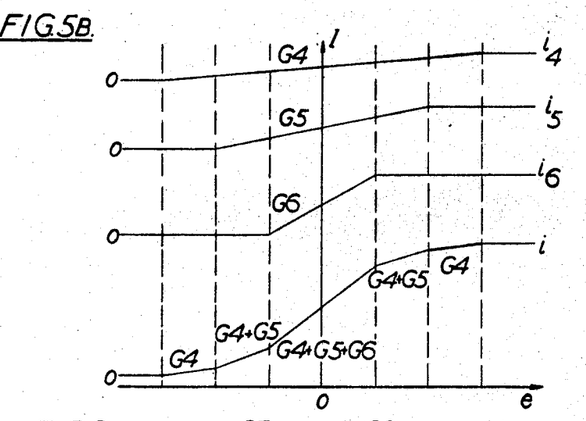
FIG. 5B is the series of curves illustrating the voltage/current characteristics of the block diagram of FIG. 5A.

FIG. 5B shows the separate characteristics $i_4$, $i_5$ and $i_6$ of each of the units G4, G5 and G6, and the resultant characteristic $i$ of the combined outputs.

Figure 6A:
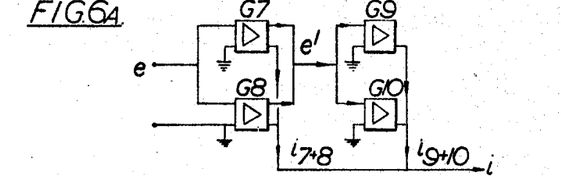
FIG. 6A is a block diagram of a combination of parallel-tandem non-linear circuit units embodying the present invention.

While the parallel combination shown in FIG. 4A is the fastest responding circuit, it is limited in the ratio of maximum to minimum slope it can provide. On the other hand the arrangement of FIG. 5A is limited in that the time delays and dispersions of the successive stages are cumulative and so the response time is relatively long. A compromise arrangement intermediate between the parallel and tandem combinations in both slope range and speed, is shown in FIG. 6A. Here two groups of two units in parallel G7, G8 and G9, G10 are connected in tandem.

Figure 6B:
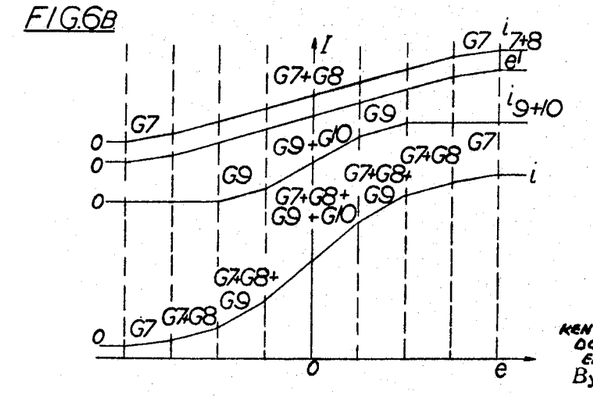
FIG. 6B is the series of curves illustrating the voltage/current characteristics of the block diagram of FIG. 6A.

The currents $i_{7+8}$ and $i_{9+10}$ are related to the inputs $e$ and $e'$ respectively, in the same way as the output current and input voltage of a parallel combination. The greatest advantage of this parallel tandem arrangement is obtained when the operating range of the second group (G9 and G10) lies wholly within the operating range of the first group (G7 and G8). This is illustrated in FIG. 6B which shows the characteristics of the current output $i_{7+8}$ of the first group, the voltage output $e'$ and the characteristic of output $i_{9+10}$. It will be seen that quite a high ratio of maximum to minimum slope in the final output current $i$ can be obtained by the arrangement of FIG. 6A.

Figure 7A:
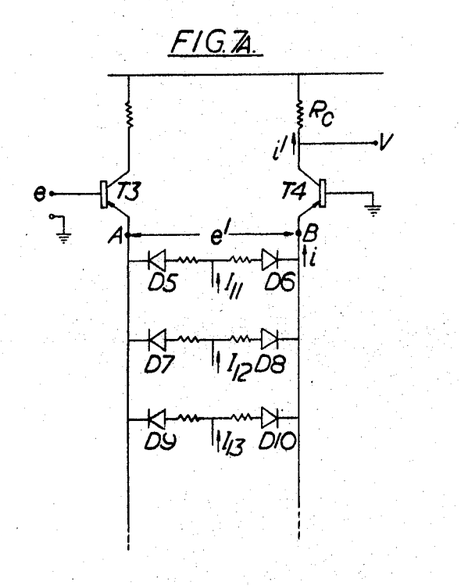
FIG. 7A is a schematic diagram of a circuit in which current switching diode pairs are coupled with a current switching transistor circuit unit embodying the present invention.

One of the features of the transistor pair is the gain obtainable per stage, which distinguishes it from the diode pair. While the latter can be built up into a non-linear network without a gain stage, it is convenient to couple the simplicity of diode pairs with a transistor stage to provide gain. FIG. 7A illustrates a combination of transistor and diode current switching circuit units. The transistor unit $T_3$, $T_4$ is connected in series with the parallel combination of diode pairs D5, D6, D7, D8 and D9, D10. Each diode pair is fed from a current source $I_{11}$, $I_{12}$ and $I_{13}$ respectively. It has been stated above that the range of any individual non-linear circuit unit is dependent on the value of IR. It will be seen from FIG. 7A that the diode pairs can either be identical and fed with different values of I, or they can all have the same value of R and have different values of I. Of course they can also have different values for both I and R.

The voltage $e'$ appearing at points A and B will be similar to that between the bases of transistors T3 and T4, and the current $i'$ will also resemble $i$ at point B. Disregarding for the moment the effect of the transistors, the emitter combination can be analyzed as follows.

The diode pairs, as has been stated earlier, have characteristics silimar to that of the transistor pair.

In general:

$$i = 0 \text{ when } e' \leq -IR$$

$$i = ge' + \frac{1}{2}I \text{ when } -IR \leq e' \leq +IR \text{ and when } g = \frac{1}{2}R$$

$$i = I \text{ when } +IR \leq e'$$

Figure 7B:
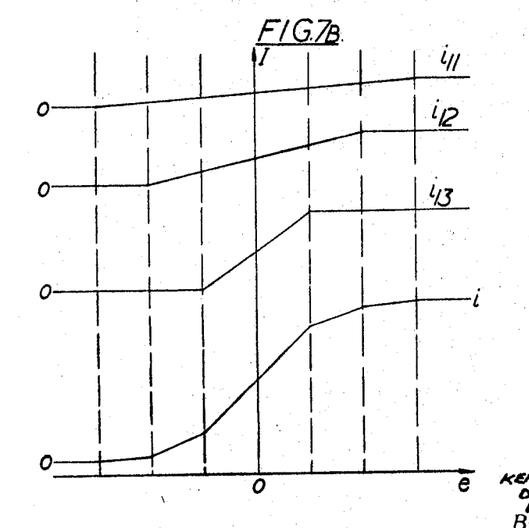
FIG. 7B is the series of curves illustrating the voltage/current characteristics of the circuit of FIG. 7A.

The combination of FIG. 7A therefore produces the characteristic shown in FIG. 7B. Again the three characteristics $i_{11}$, $i_{12}$ and $i_{13}$ of the diode pairs are added to provide the non-linear characteristic which is approximated by the curve $i$. The total input and output currents may be set down as $$I = \sum_{r=1}^{n} I_r \text{ and } i = \sum_{r=1}^{n} i_r$$

The limitation of the network shown in FIG. 7A are the same as those on the paralleled transistor pairs of FIG. 4A. That is, the ratio of maximum to minimum slope is restricted. The resistor components of the emitter section with the highest slope ($g$) have a lower limit imposed by the characteristics of the diodes such that the diode incremental resistance must be small in camparison. Hence the slope ratio will define the maximum value of resistance used in the lowest slope section, which in turn defines the maximum value of $e'$, and also the D.C. supply voltage for the system. For a high maximum to minimum slope ($g_n/g_1$) ratio some form of amplification is necessary.

The current $i$ flowing through the collector resistor $R_c$ gives rise to a voltage $$iR_c = V$$

which has the same form of the lowest slope curve shown in FIG. 7B. If $R_c$ is increased, the slope of the curve will increase and if the emitter resistance is increased the slope of the curve will decrease.

Figure 8:
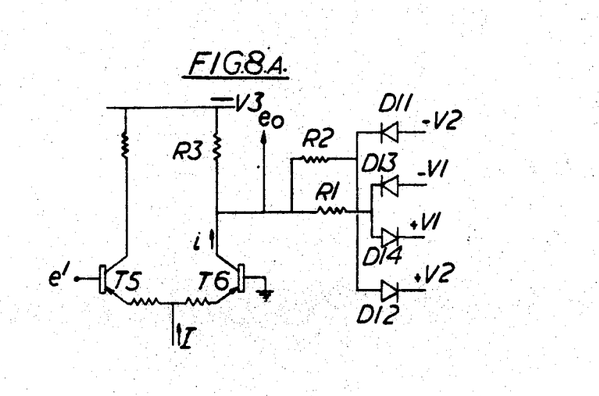
FIG. 8A is the schematic diagram of a circuit in which voltage switching diode pairs are coupled with a current switching transistor circuit unit embodying the present invention.
FIG. 8B is the series of curves illustrating the voltage/current characteristics of the circuit of FIG. 8A.

Having described various combinations of current switching circuit units, it is now appropriate to turn to combniations of voltage switching units. In FIG. 8A two pairs of diodes D11, D12 and D13, D14 are shown connected in parallel in a voltage switching arrangement. The current input for this arrangement is derived from the collector of transistor T6, which together with transistor T5 forms a current switching pair.

Each diode pair of FIG. 8A corresponds to an arrangement according to FIG. 3A. Each diode pair has a different value of voltage V, and may have different values of resistance. The characteristics of the two diode pairs are shown as $i_{14}$ and $i_{15}$ in FIG. 8B. It will be remembered that in the earlier description of the voltage switching circuit unit of FIG. 3A it was stated that the characteristic was shown as though it were a current switching characteristic. Therefore the characteristics of FIG. 8B are denoted by reference to $i$ rather than $e$. The curve labeled $i_{16}$ is a plot of the current flowing tthrough $R_3$. When the three individual characteristics are combined they provide a non-linear curve as approximately shown by the bottom characteristic of FIG. 8B. It will be noted that this curve is complementary in shape to the resultant curve of FIG. 7B. Since the emitter circuits are voltage driven and the collector circuits operate on the resultant collector current, the bottom curve of FIG. 8B, which in fact represents the output voltage $e_0$ (though drawn as a current curve) can be shown to resemble the composite curve of FIG. 7B by rotating it through 90° and inverting it.

Figure 9A:
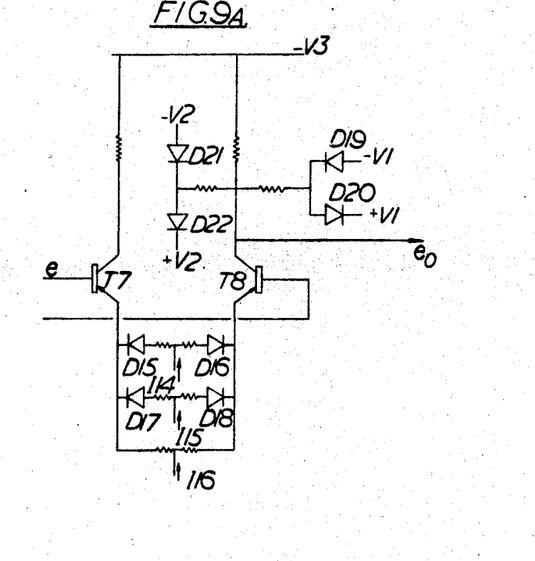
FIG. 9A is the schematic diagram of a circuit combining voltage switching diode circuit units, current switching diode circuit units and a current switching transistor circuit unit embodying the present invention.

Non-linear networks of the types described are particularly suitable for use in amplitude compression and expansion equipments utilized in pulse code modulation speech transmission. The application of non-linear networks to amplitude compression is illustrated by the combination of voltage switching units with current switching units as shown in FIG. 9A. The transistor pair T7, T8 is connected in series with the parallel combination of diode pair D15, D16 and 17, 18, to form a current switching network. There are separate current feeds 114, 115, and 116 for the diode pairs and the transistor pair respectively. The collector circuit of transistor T8 is used to drive a voltage switching circuit which includes two diode pairs D19, D20 and D21, D22.

Figure 9B:
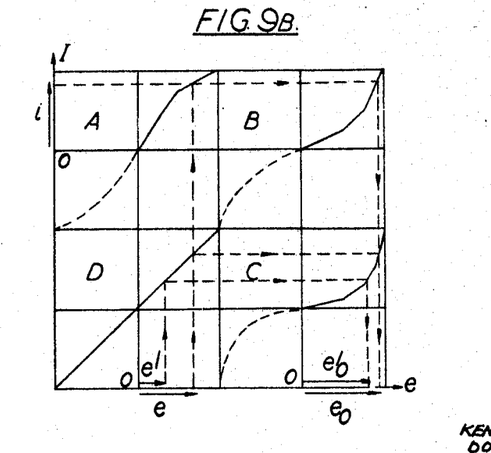
FIG. 9B is the series of curves illustrating the voltage/current characteristics of the circuit of FIG. 9A.

The voltage/current characteristics of the combination are shown in FIG. 9B, which illustrates separately the current switching characteristic A, the voltage switching characteristic B and the composite characteristic C. Considering an input voltage $e$ to the base of transistor T7 a line projected vertically from the base to intercept characteristic A will indicate the current $i$ flowing in the collector circuit of transistor T8.

Since, as has been stated above, the voltage switching characteristic B has been drawn with reference to the same co-ordinates as characteristic A, it is only necessary to project horizontally to the right the value of $i$ to obtain an interception with characteristic B, which will provide a value for the output voltage $e_0$. To ascertain this value for $e_0$ it is only necessary to project the interception with characteristic B down to the same scale as the input value $e$.

Since the total gain of the stage is obtained by reference to the input voltage $e$ and the output voltage $e_0$, the overall characteristic C for this stage is obtained by plotting $e_0$ against $e$. To do this a straight line is drawn in quadrant D at 45° to the co-ordinates, and the interception of $e$ with this line is projected horizontally to the right, The projections of $e$ and $e_0$ intercepting in quadrant C will form a point on the overall characteristic of the stage.

To illustrate the amplitude compression of the stage it will be seen that if the input voltage is reduced by half to $e'$, the output voltage $e_0'$ is considerably greater than half $e_0$. Thus although there is gain in the stage for all input voltages, the higher voltages are subjected to proportionately less gain than the lower voltages.

When considering the opposite type of non-linear network, the expansion network, it is apparent that the same principles of construction apply, except that the roles of current switching circuit units and voltage switching circuit units are reversed. Thus, whereas the compressor circuit of FIG. 9A used current switching networks in the emitter connection of PNP transistors, the expansion circuit of FIG. 10A uses the current switching diode pairs D22, D23 and D24, D25 in the collector circuits of NPN transsitors T9 and T10. Similarly, the emitter circuits of T9 and T10 are now connected with the voltage switching diode pairs D26, D27, D28, D29, D30, D31 and D32, D33, respectively.

Figure 10A:
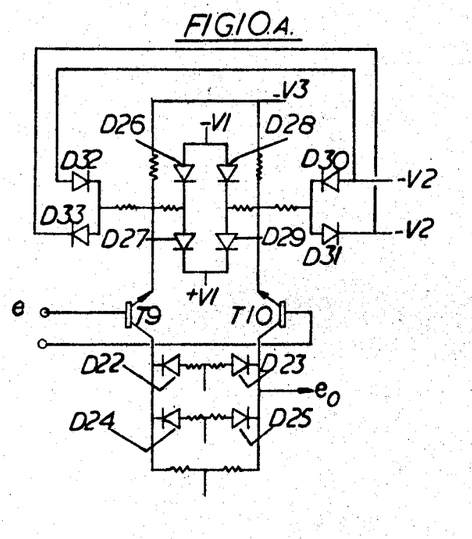
FIG. 10A is the schematic diagram of another circuit combining voltage switching diode circuit unit, current switching diode circuit units and a current switching transistor circuit unit embodying the present invention.
Figure 10B:
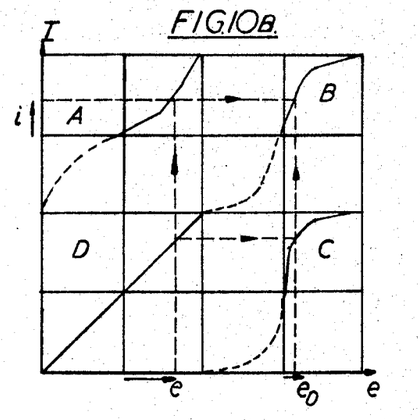
FIG. 10B is the series of curves illustrating the voltage/current characteristics of the circuit of FIG. 10A.

The response of the expander circuit is shown in FIG. 10B, and is determined in exactly the same way as the response of the compressor circuit. In this case the input voltage $e$ is first set off against the voltage switching characteristic A, to determine the current $i$ flowing in the emitter circuits of the transistors. This value $i$ is projected horizontally to determine the output voltage $e_0$ obtained in the collector network.

As in the case of the compressor, the overall response is obtained by plotting $e_0$ against $e$, and the same procedure is adopted of drawing a line at 45° to the co-ordinates and then transferring $e$ as a horizontal value into quadrant C. Again, by plotting other values of $e$ and $e_0$ it can be shown that as $e$ increases it is subject to increasing gain in the expander network.

It has been pointed out previously that each of the non-linear characteristics is in fact made up of a number of linear segments. This is true of the characteristics of both the compressor and expander networks. Reference to FIGS. 9B and 10B will show that it is possible to design voltage switching networks and current switching networks which, when combined, have linear segments which do not occur over the same range as each other. Thus there is a change of linearity in one portion of the composite network at a point where the other portions remain linear for a substantial range of values.

Figure 11:
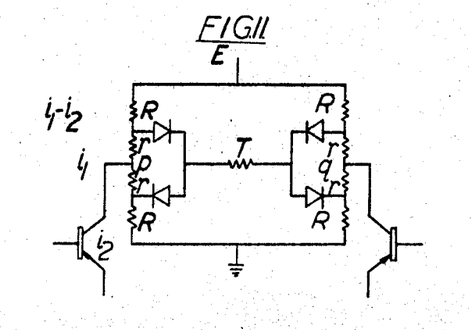
FIG. 11 is the schematic diagram of a voltage bias network for voltage switching diode circuit units.

Reference to FIGS. 9A and 10A discloses the need for supplying different bias voltages $V_1$, $V_2$ and $V_3$ to the voltage switching diode pairs. These bias voltages can be provided by a symmetrical network such as that shown in FIG. 11. In this network there will be currents $i_1$ and $i_2$ flowing such that $$(R+r)(i_1+2i_2)=E_0$$

and $i_1=i_c$, the collector current at voltage balance; i.e. the E.M.F. at point $p$ equals the E.M.F. at point $q$.

The value of $r$ is chosen according to the relationship $$r(i_1+2i_2)=V_1$$

At balance all the diodes are reverse biased and the individual collector load impedances will be $$Z_L=(R+r)/2$$

Figure 12:
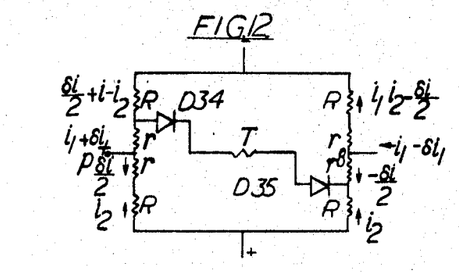
FIG. 12 is a partial schematic diagram of the voltage bias network of FIG. 11.

In FIG. 12 (which corresponds to part of FIG. 11) the case is illustrated when point $p$ swings negatively and point $q$ swings positively by equal amounts. Diodes D34 and D35 begin to conduct and the potential difference between points $p$ and $q$ will be $$V_{pq}=r(i_1+2i_2)+r\delta i_1$$
$$=V_1, \text{ very closely}$$

Any further increase of $i$ (collector current) will flow partly through the diode circuit, and the new value for $Z_L$ will be $$Z'_L=\frac{2Z_L\left(r+\frac{RT}{2R+T}\right)}{2Z_L+r+\frac{RT}{2R+T}}$$

Also $$Z'_L=2\cdot\frac{Z_LT'}{Z_L+T'}$$

where $$T'=\frac{1}{2}\left(r+\frac{RT}{2R+T}\right)$$

Figure 13:
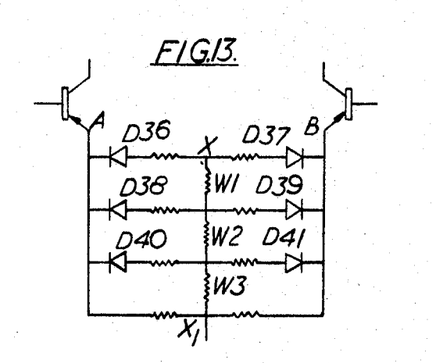
FIG. 13 is the schematic diagram of a plurailty of non-linear circuit units coupled together and utilizing a single common current source embodying the present invention.

FIG. 13 shows an arrangement of current switching diode pairs D36, D37 . . . D41 utilizing only one current source I. This network works on the principle that the center point X of a current fed diode pair suffers a change in potential equal to $e/2$ with respect to point B when the potential at A varies by an amount $e$. Hence in the case of two or more diode pairs in parallel the center points of the individual pairs can be connected by resistors W1, W2, W3. The separate current sources are omitted and replaced by a single current source I feeding to the extreme voltage point $X_1$ on the network.

The complete block of diode pairs acts in a similar manner to the network of FIG. 7A until diode D37 shuts off. At this time current commences to flow in resistance W1, and consequently the network parameters are altered. As the potential $e$ at point A increases, resistance W2 and then resistance W3 are progressively effective, and the overall voltage/current characteristic is changed accordingly.

Figure 14:
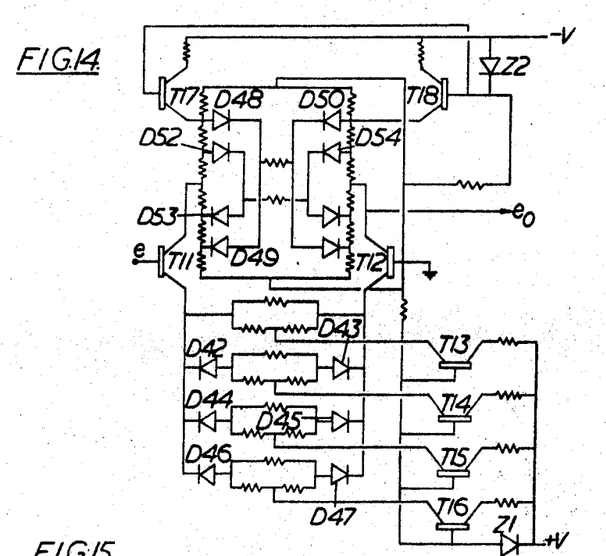
FIG. 14 is the schematic diagram of a complete amplitude compression circuit embodying the present invention for use in communication systems.

A complete non-linear network suitable for amplitude compression in a speech transmission system is illustrated in FIG. 14. The input $e$ is to the base of transistor T11, which together with transistor T12 forms a current switching circuit unit in parallel with the current switching diode pairs D42, D43 . . . D47. Separate current feeds for each circuit unit are provided by transistors T13, T14, T15 and T16 in conjunction with Zener diode Z1. The collector circuits of transistors T11 and T12 are connected to the voltage switching diode pairs D48, D49 . . . D55, and the voltages to this network are regulated by the currents taken by the transistors T17, T18 in conjunction with Zener diode Z2. The final output $e_0$ is obtained from the collector of transistor T13.

Figure 15:
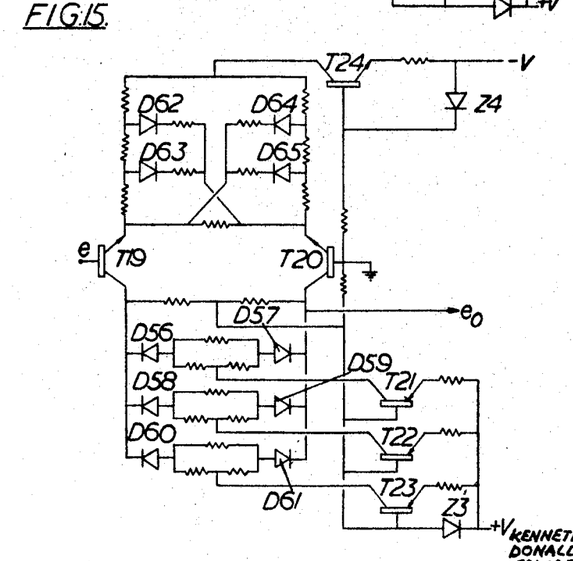
FIG. 15 is the schematic diagram of a complete amplitude expansion circuit embodying the present invention which is complementary to the circuit of FIG. 14, for use in communication systems.

An expander circuit complementary to the compressor is shown in FIG. 15. In this case the current switching diode pairs D56, D57 . . . D61 in the collector circuits of transistors T19, T20 are fed with current from the transistors T21, T22 and T23 in conjunction with the Zener diode Z3. The voltages for diodes D62, D63, D64 and D65 are regulated by transistor T24 in conjunction with Zener diode Z4. Again the input $e$ is to the base of transistor T19 and the output $e_0$ is from the collector of transistor T20.

While we have described above the principles of our invention in connection with specific apparatus, it is to be clearly understood that this description is made only by way of example and not as a limitation to the scope of our invention, as set forth in the objects thereof and in the accompanying claims.

We claim:
1. A non-linear network comprising:
   a plurality of non-linear circuit units each having different voltage/current characteristics;
   means coupling said circuit units with their outputs in parallel;
   at least one of said units comprising a pair of transistors;
   means coupling said transistors together in a voltage driven current switching arrangement;
   at least one other of said units comprising a pair of diodes; and means coupling said diodes together in a current driven voltage switching arrangement.

2. A network according to claim 1 further comprising means for coupling the inputs of at least two of said circuit units in parallel.

3. A network according to claim 1 further comprising means for coupling at least two of said non-linear circuit units in tandem, whereby an output from the first and each succeeding unit provides the input for each next succeeding unit.

4. A network according to claim 1 further comprising:
means for coupling the inputs of two or more said units in parallel; and
means for coupling a plurality of said parallelly coupled units in tandem;
whereby the outputs from the units comprising the first and each succeeding parallelly coupled group of units are coupled in parallel and the output from the first said group and each succeeding group also provides the input for each next succeeding group.

5. A network according to claim 1 wherein at least one of said nonlinear circuit units comprises:
a pair of diodes; and
means coupling said diodes together in a voltage driven current switching diode circuit unit.

6. A non-linear network comprising:
a pair of transistors;
means coupling said transistors together in a voltage driven current switching arrangement;
a plurality of diodes;
means coupling pairs of said diodes in a plurality of voltage driven current switching diode circuit units;
means coupling said plurality of current switching diode circuit units in parallel; and
means coupling the common input of said parallel combination of diode circuit units to the emitters of said transistors.

7. A non-linear network comprising:
a pair of transistors;
means coupling said transistors together in a voltage driven current switching arrangement;
a plurality of diodes;
means coupling pairs of said diodes in a plurality of voltage driven current switching diode circuit units;
means coupling said plurality of current switching diode circuit units in parallel; and
means coupling the common input of said parallel combination of diode circuit units to the collectors of said transistors.

8. A non-linear network comprising:
a pair of transistors;
means coupling said transistors together in a voltage driven current switching arrangement;
a plurality of diodes;
means coupling pairs of said diodes into one or more current driven voltage switching diode circuit units; and
means coupling each of said voltage switching diode circuit units in series with the output of the said transistor pair.

9. A non-linear network comprising:
a pair of transistors;
means coupling said transistors together in a voltage driven current switching arrangement;
a plurality of diodes;
means coupling pairs of said plurality of diodes in one or more voltage driven current switching diode circuit units;
means coupling pairs of said plurality of diodes in one or more current driven voltage switching diode circuit units;
means coupling said current switching diode units in parallel with said transistors; and
means coupling said voltage switching diode units in series with one of said transistors.

10. A non-linear network comprising:
a pair of transistors;
means coupling said transistors together in a voltage driven current switching arrangement;
means coupling said transistors to a common current source;
a plurality of diodes;
means coupling pairs of said plurality of diodes and one or more voltage driven current switching diode circuit units utilizing a common current source;
means coupling said current switching diode circuits and the transistors in parallel;
means coupling pairs of said diodes in one or more current driven voltage switching diode circuit units; and
means coupling each of said voltage switching diode circuit units in series with one of said transistors.

11. A non-linear network according to claim 10 including:
means coupling the emitters of said transistors to a current source; and
means for coupling the current switching diode circuit units and the collectors of said transistors to the said voltage switching diode circuit units.

12. A non-linear network according to claim 10 including:
means coupling the collectors of said transistors to a current source; and
means for coupling the current switching diode circuit units and the emitters of said transistors to the said voltage switching diode circuit units.

References Cited

UNITED STATES PATENTS

| | | | |
|---|---|---|---|
| Re. 26,029 | 5/1966 | Nathan | 307—88.5 |
| 1,477,017 | 1923 | Sprague | 328—143 |
| 1,737,830 | 1925 | Crisson | 333—143 |
| 2,074,047 | 1937 | De Chant | 333—14 |
| 2,480,201 | 1949 | Selove | 328—143 |
| 2,768,352 | 1956 | Von Sivers | 333—14 |
| 2,958,831 | 1960 | Clark | 333—14 |
| 3,031,142 | 1962 | Cohen | 307—88.5 |

ARTHUR GAUSS, *Primary Examiner.*

H. A. DIXON, *Assistant Examiner.*

U.S. Cl. X.R.
307—270; 328—143